(12) United States Patent
Anderson

(10) Patent No.: US 7,318,010 B2
(45) Date of Patent: Jan. 8, 2008

(54) METHOD OF REGULATING WIRELESS SENSOR NETWORK ENERGY USE

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/348,918

(22) Filed: Feb. 7, 2006

(65) Prior Publication Data

US 2007/0185660 A1   Aug. 9, 2007

(51) Int. Cl.
G08C 19/16   (2006.01)
(52) U.S. Cl. .............. 702/188; 702/122; 340/870.01; 340/521; 340/584; 340/531; 455/11.1
(58) Field of Classification Search .......... 340/531, 340/521, 539.1, 870.01, 584; 702/122, 182; 370/254, 350; 709/224; 379/93.01, 331, 379/338; 375/259; 455/11.1
See application file for complete search history.

(56) References Cited

U.S. PATENT DOCUMENTS

| 7,027,773 | B1* | 4/2006 | McMillin ................ 455/41.2 |
| 7,109,859 | B2* | 9/2006 | Peeters ................ 340/539.11 |
| 2003/0007473 | A1* | 1/2003 | Strong et al. ............ 370/338 |
| 2003/0063585 | A1* | 4/2003 | Younis et al. ............ 370/331 |
| 2003/0228005 | A1* | 12/2003 | Melick et al. .......... 379/93.01 |
| 2005/0057370 | A1* | 3/2005 | Warrior et al. ........ 340/870.01 |
| 2005/0063326 | A1 | 3/2005 | Ohkuma et al. |
| 2005/0064871 | A1 | 3/2005 | Kawasaki et al. |
| 2005/0122231 | A1 | 6/2005 | Varaiya et al. |
| 2006/0087423 | A1* | 4/2006 | Coronel et al. .......... 340/539.1 |
| 2006/0176169 | A1* | 8/2006 | Doolin et al. ............ 340/521 |
| 2006/0250980 | A1* | 11/2006 | Pereira et al. ............ 370/254 |
| 2007/0003146 | A1* | 1/2007 | Ko et al. .................. 382/224 |
| 2007/0115827 | A1* | 5/2007 | Boehnke et al. .......... 370/236 |

FOREIGN PATENT DOCUMENTS

AU    2003100531 A4 *  9/2003

OTHER PUBLICATIONS

*Optimal Placement of Relay Nodes In Sensor Networks*, by Sinem Coleri and Pravin Varaiya, 14 Pages, Mar. 29, 2004.
*Efficient Energy Management in Sensor Networks Efficient Energy Management in Sensor Networks*, by P. Berman, G. Calinescu, C. Shah and A. Zelikovsky, 16 Pages.
*STEM: Topology Management For Energy Efficient Sensor Networks*, by Curt Schurgers, Vlasios Tsiatsis and Mani B. Srivastava, 10 Pages.
*The Design Space Of Wireless Sensor Networks*, by Kay Römer and Friedemann Mattern, 9 Pages.

(Continued)

Primary Examiner—Carol S. W. Tsai

(57) ABSTRACT

A method of regulating wireless sensor network energy use includes establishing a wireless sensor network having at least one access point node, and having a plurality of sensor nodes defining a sensing region; identifying at least one environment parameter related to an environment of the sensing region that is needed to make an operational decision; and adjusting data collection from the plurality of sensor nodes based on the at least one environment parameter to adjust a power consumption of at least one sensor node of the plurality of sensor nodes.

21 Claims, 4 Drawing Sheets

OTHER PUBLICATIONS

*Power Efficient Monitoring Management In Sensor Networks*, by P. Berman, G. Calinsescu, C. Shah and A. Zelikovsky, 6 Pages.

*Node-Level Energy Management For Sensor Networks In The Presence Of Multiple Applications*, by Athanassios Boulis and Mani Srivastava, 23 Pages.

*Geography-Informed Energy Conservation For Ad Hoc Routing*, by Ya Xu, John Heidemann and Deborah Estrin, 15 Pages.

*Heterogeneous Sensor Networks*, http://www.intel.com/research/exploratory/heterogeneous.htm, 51 Pages.

* cited by examiner

METHOD OF REGULATING WIRELESS SENSOR NETWORK ENERGY USE

FIELD OF THE INVENTION

The present invention is related to wireless sensor networks, and more particularly, to a method of regulating wireless sensor network energy use.

BACKGROUND OF THE INVENTION

Wireless sensor networks have been proposed with potential applications, for example, in environmental, surveillance, military, health and security monitoring. Such a network includes a group of sensor nodes, each with one or more sensors, an embedded processor, and a low power receiver/transmitter. Typically, these nodes are linked by a wireless medium to perform distributed sensing tasks.

In one such network, for example, the sensor nodes may form an ad hoc network where communication between two arbitrary nodes may take more than one "hop", i.e., the message may travel through one or intermediate nodes rather than via a direct transmission. The ad hoc network typically has one or more access point (AP) nodes that have greater energy availability and can transmit data to the world at large through wired, e.g., telephone line, or wireless, e.g., cell phone, communications systems. In contrast, the sensor nodes have a limited available power source, e.g., battery, and in turn, limited transmission power.

Some efforts have been made to conserve energy in wireless sensor networks so as to extend the useful life of the network. One such effort, for example, proposes energy conservation in a wireless sensor by identifying nodes that are equivalent from a routing perspective, i.e., redundant, and then turning off unnecessary nodes. Thus, the energy needed for communications is reduced by optimizing network topography for maximum area coverage.

SUMMARY OF THE INVENTION

The present invention manages wireless sensor network energy use based on one or more environment parameters related to the environment of a sensing region, wherein such environment parameters may, for example, be associated with operational decisions to be made.

The invention, in one form thereof, is directed to a method of regulating wireless sensor network energy use. The method includes establishing a wireless sensor network having at least one access point node, and having a plurality of sensor nodes defining a sensing region; identifying at least one environment parameter related to an environment of the sensing region that is needed to make an operational decision; and adjusting data collection from the plurality of sensor nodes based on the at least one environment parameter to adjust a power consumption of at least one sensor node of the plurality of sensor nodes.

The invention, in another form thereof, is directed to a method of regulating wireless sensor network energy use in a wireless sensor network having at least one access point node, and having a plurality of sensor nodes defining a sensing region. The method includes generating an energy management plan for a sensing mission that lasts for a management period, the energy management plan controlling an operation of the plurality of sensor nodes based on at least one environment parameter related to an environment of the sensing region; downloading at least a portion of the energy management plan to the plurality of sensor nodes; and adjusting data collection from the plurality of sensor nodes based on the energy management plan during the management period to adjust a power consumption of at least one sensor node of the plurality of sensor nodes.

The invention, in another form thereof, is directed to a method of regulating wireless sensor network energy use in a wireless sensor network having at least one access point node, and having a plurality of sensor nodes defining a sensing region. The method includes generating an energy management plan for a management period for a sensing mission, the energy management plan having a plurality of energy management sub-plans for a corresponding plurality of management sub-periods for a corresponding plurality of sensing sub-missions; identifying relevant environment parameters for the sensing region for a current energy management sub-plan for a current sensing sub-mission; generating for the current energy management sub-plan a plurality of individualized sensor management and data transfer plans for the plurality of sensor nodes based on the relevant environment parameters; downloading to each individual sensor node a corresponding sensor management and data transfer plan of the plurality of individualized sensor management and data transfer plans; executing the plurality of individualized sensor management and data transfer plans by the plurality of sensor nodes; and transferring data from the plurality of sensor nodes to a management computer in accordance with the plurality of individualized sensor management and data transfer plans.

The invention, in another form thereof, is directed to a wireless sensor network. The wireless sensor network includes a management computer, at least one access point node interacting with the management computer, and a plurality of sensor nodes defining a sensing region. The plurality of sensor nodes are communicatively coupled to the management computer via the at least one access point node. The management computer is operable to identify at least one environment parameter related to an environment of the sensing region that is needed to make an operational decision. The management computer is operable to adjust data collection from the plurality of sensor nodes based on the at least one environment parameter to adjust a power consumption of at least one sensor node of the plurality of sensor nodes.

DETAILED DESCRIPTION OF THE INVENTION

Figure 1:
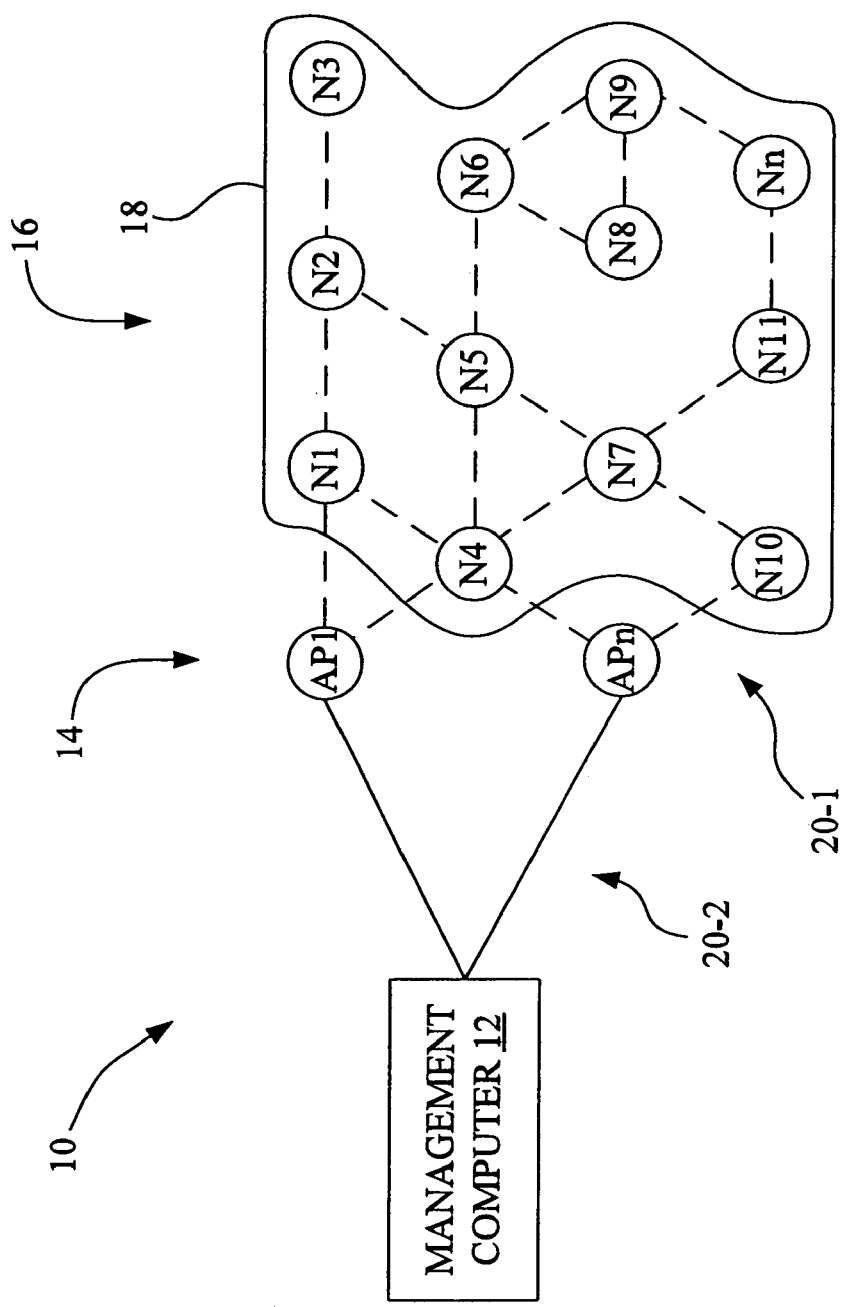
FIG. 1 is a diagrammatic representation of an exemplary wireless sensor network in accordance with an embodiment of the present invention.

Referring now to the drawings, there is shown in FIG. 1 a diagrammatic representation of an exemplary wireless sensor network 10 in accordance with an embodiment of the present invention. Network 10 may be, for example, an ad hoc network, and includes a management computer 12, a plurality of access nodes (AP) 14 and a plurality of sensor nodes (N) 16. The plurality of access nodes 14 are individually identified as access point nodes AP1, . . . APn, wherein n is an integer.

The plurality of sensor nodes 16 are positioned over a sensing region 18, and are individually identified as sensor nodes N1, N2, . . . Nn. Sensor node Nn represents the nth sensor node positioned in sensing region 18, wherein n is an integer. Any particular node Nx (where x is from 1 to n) of the plurality of sensor nodes 16 is able to communicate with one or more other sensor nodes, so as to form multi-hop paths to one or more of the AP nodes 14. Wireless communications paths 20-1 are established being between various sensor nodes 16 and with AP nodes 14, and are represented by dashed lines. Communications paths 20-2, which may be wired or wireless, are established between AP nodes 14 and management computer 12, and are represented by solid lines.

Due to the costs associated with sensor nodes 16, in one embodiment only as many sensor nodes n as are needed to perform the sensing mission will be distributed in sensing region 18, i.e., there is no redundant sensor nodes. Sensing region 18 is an outdoor area, such as for example, a field, a forest, etc. Thus, the present invention may be used, for example, for agricultural, silvaculture, and turf care applications.

Management computer 12 may be, for example, a computer configured to execute sensor management software for monitoring and controlling sensing operations in sensing region 18 via AP nodes 14 and at least a portion of sensor nodes 16, so as to provide, for example in-season data, e.g., crop, atmosphere, and soil data, to guide operational decisions, e.g., crop production management decisions. In addition, management computer 12 may execute crop modeling and geostatistics software. This includes, for example, obtaining field data to improve timing of field operations, to tune crop and soil models, and/or to provide warnings of disease and insect problems.

Management computer 12 may be, for example, co-located with one of AP nodes 14, or located on a server, a laptop computer, a personal digital assistant (PDA), or a desktop computer. Functions performed by management computer 12 may in actual practice be located on one computer, or distributed across several computers with different programs to perform assigned individual functions. For example, crop modeling and geostatistics software may run on a different computer than the sensor network management software that manages wireless sensor network 10.

In the exemplary wireless sensor network 10 of FIG. 1, the AP nodes 14 are shown positioned at the periphery of sensing region 18. Those skilled in the art, however, will recognize that this need not be the case and that other configurations, such as a configuration with one or more of AP nodes 14 positioned inside sensing region 18, may be used, if desired.

AP nodes 14 are typical of that known in the art. AP nodes 14 typically will have a high energy availability, e.g., access to a permanent energy source, such as AC current, and can transmit data to the world at large through wired (e.g., telephone line) or wireless (e.g., cell phone) communications. AP nodes 14 may serve as the gateway between the sensor network of the plurality of sensor nodes 16 and the rest of the world, e.g., via the Internet.

Figure 2:
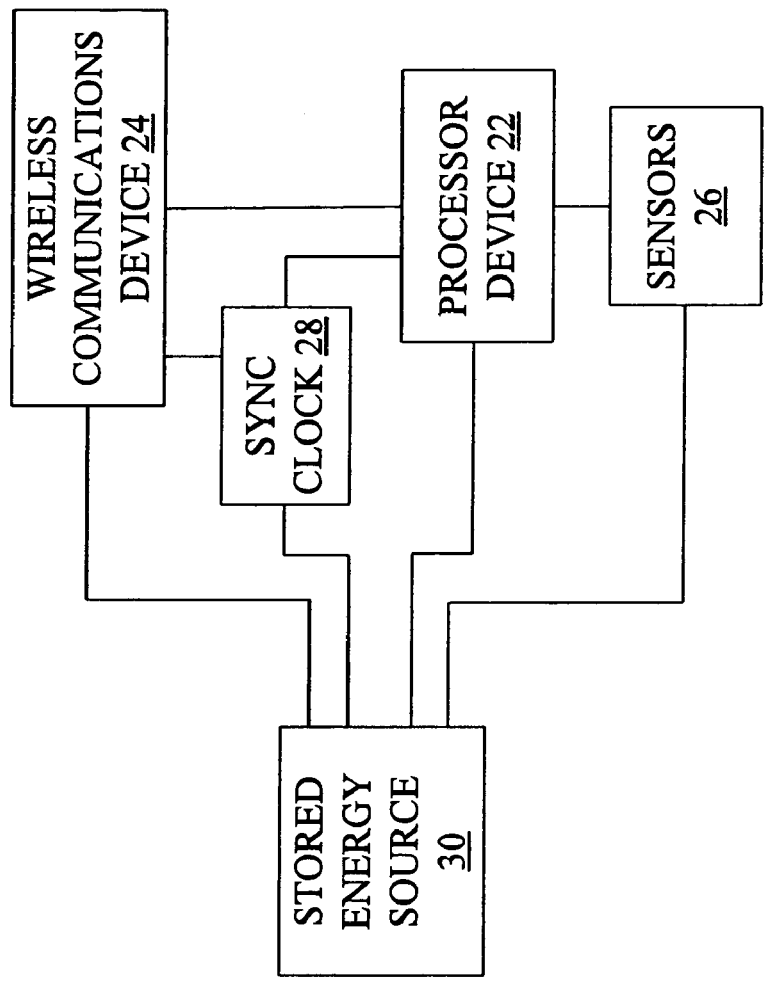
FIG. 2 is a block diagram of one of the sensor nodes of the wireless sensor network of FIG. 1.

Referring to FIG. 2, each sensor node Nx (where x is from 1 to n) of the plurality of sensor nodes 16 includes such components as a processor device 22, a wireless communications device 24, one or more sensors 26, a synchronizing clock 28, and a stored energy source 30. The sensor nodes 16 may be homogenous in terms of energy storage, processing, and sensors, or they may be heterogenous in these aspects.

Processor device 22 includes a microprocessor and associated memory, and executes program instructions to read and process sensor data supplied by sensors 26, to initiate wireless data transfer via wireless communications device 24, and to manage energy use by the node components of the particular sensor node Nx.

Wireless communications device 24 may be, for example, a low power, short range wireless communications device using a wireless protocol, such as Zigbee (IEEE 802.15.4) or Bluetooth. If the plurality of sensor nodes 16 communicate using a combination of Zigbee, Bluetooth, or some other communication protocol, additional circuitry may be included to ensure that data can get from any of the plurality of sensor nodes 16 to one of the plurality of AP nodes 14 when needed. Of the components of sensor node Nx, wireless communications device 24 is the greatest user of energy.

Sensors 26 are typical of those known in the art, and provide localized sensing information, i.e., sensor data, about the environment of sensing region 18. Sensors 26 may sense such properties as precipitation, soil moisture, evaporation, temperature, wind speed, sound, size, bio-properties, etc.

Clock 28 is used to assist in synchronizing communication of a particular sensor node Nx with one or more other sensor nodes of the plurality of sensor nodes 16.

Stored energy source 30 may be a battery, a fuel cell, etc., whose supply of energy is depleted through use by the node components of the particular sensor node Nx. Energy provided by the stored energy source 30 of a particular sensor node Nx typically is only available for use by the node components of that particular sensor node Nx, and thus typically cannot be accessed for use by another sensor node of the plurality of sensor nodes 16.

In the present invention, energy savings is achieved by varying, e.g., in time and in frequency, when sensor data needs to be received and selecting which subset of the plurality of sensor nodes 16 will provide the sensor data, based on anticipated data needs, e.g., based on at least one environment parameter related to the environment of sensing region 18, as it relates to operational decisions, e.g., crop production management decisions. In other words, data collection from the plurality of sensor nodes 16 is adjusted based on at least one environment parameter related to the environment of sensing region 18 to adjust a power consumption of at least one sensor node of the plurality of sensor nodes 16. Energy is saved by scheduling data collection and data transfer from the subset of the plurality of sensor nodes 16 only when and where the data collection is of most value. For example, non-redundant areas in sensing region 18 may be dropped because the areas do not significantly contribute to the monitoring of a crop or field attribute of interest from a geostatistical or an evidence value perspective in sensing region 18.

As a more specific example, with reference to FIG. 1, during early spring it is desired to know when soil temperature (an environment parameter) of the entire sensing region 18 reaches 50 degrees Fahrenheit so as to enable a manager to make an operational decision as to when to begin planting corn in the sensing region 18. Also, assume that sensor nodes N1, N2, and N3 are on a north slope of sensing region 18, whereas non-redundant sensor nodes N4-Nn are on a south slope of sensing region 18. In this scenario, there is no need to use energy from sensor nodes N4-Nn in monitoring the ground temperature for sensing region 18, since in the spring in North America the south slope of sensing region 18 will receive the most sun, and accordingly, will warm up faster than the north slope of sensing region 18. Thus, in this example, sensor nodes N1, N2, N3 will form a subset for monitoring the environment parameter of soil temperature in the early spring.

Stated in another way, energy management is tied to the overall management system, e.g., operational decisions, for sensing region 18, which is monitored over an extended period of time, and management system data requirements, e.g., environment parameters for sensing region 18, are used to adjust the collection and timing of data collection of sensor data from a respective subset of sensor nodes to minimize energy usage, and in turn extend the life of the respective stored energy source 30 for one or more, or all, of the plurality of sensor nodes 16.

Figure 3A:
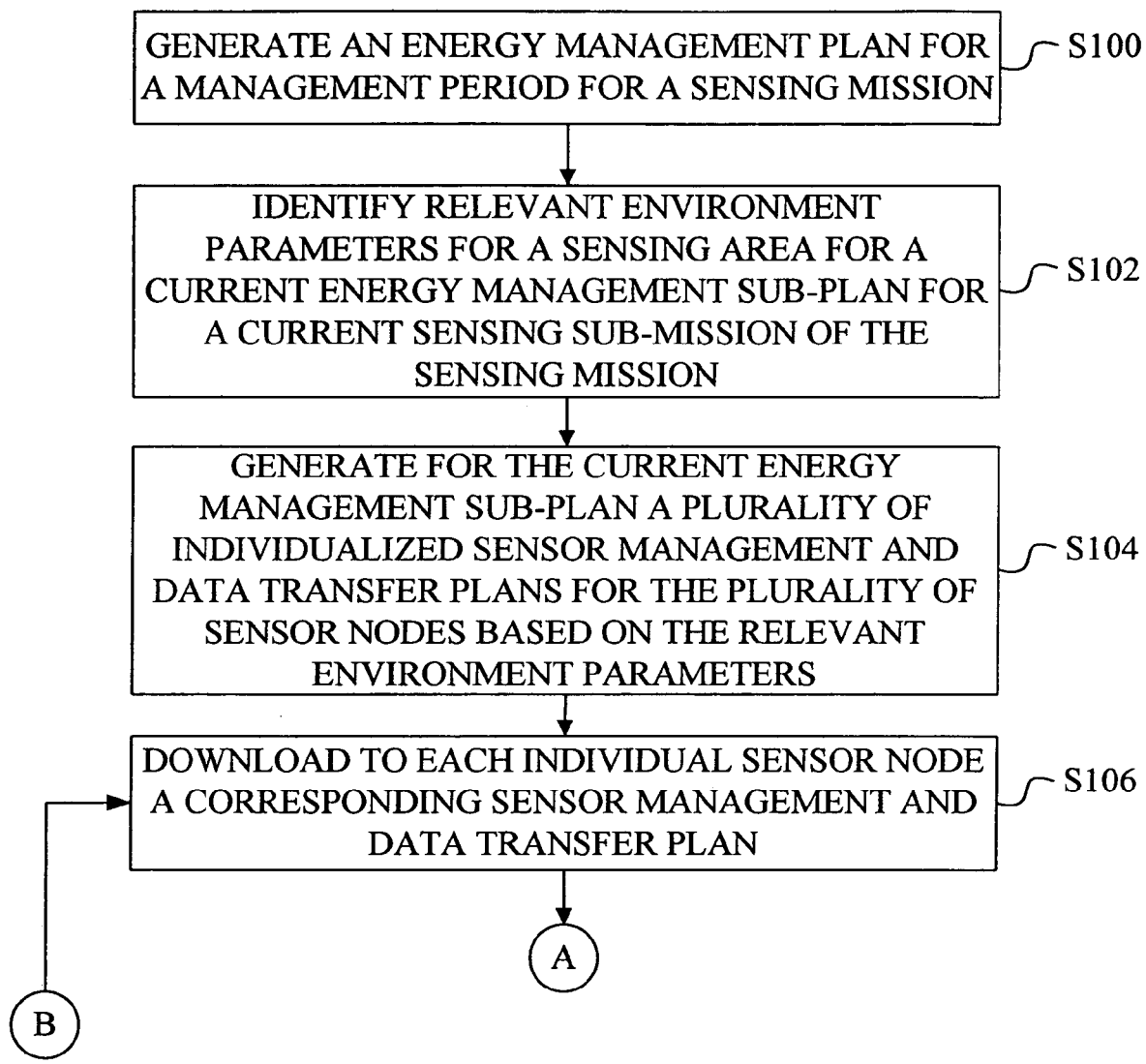
FIGS. 3A and 3B form a flowchart of a method of regulating wireless sensor network energy use in the wireless sensor network of FIG. 1.
Figure 3B:
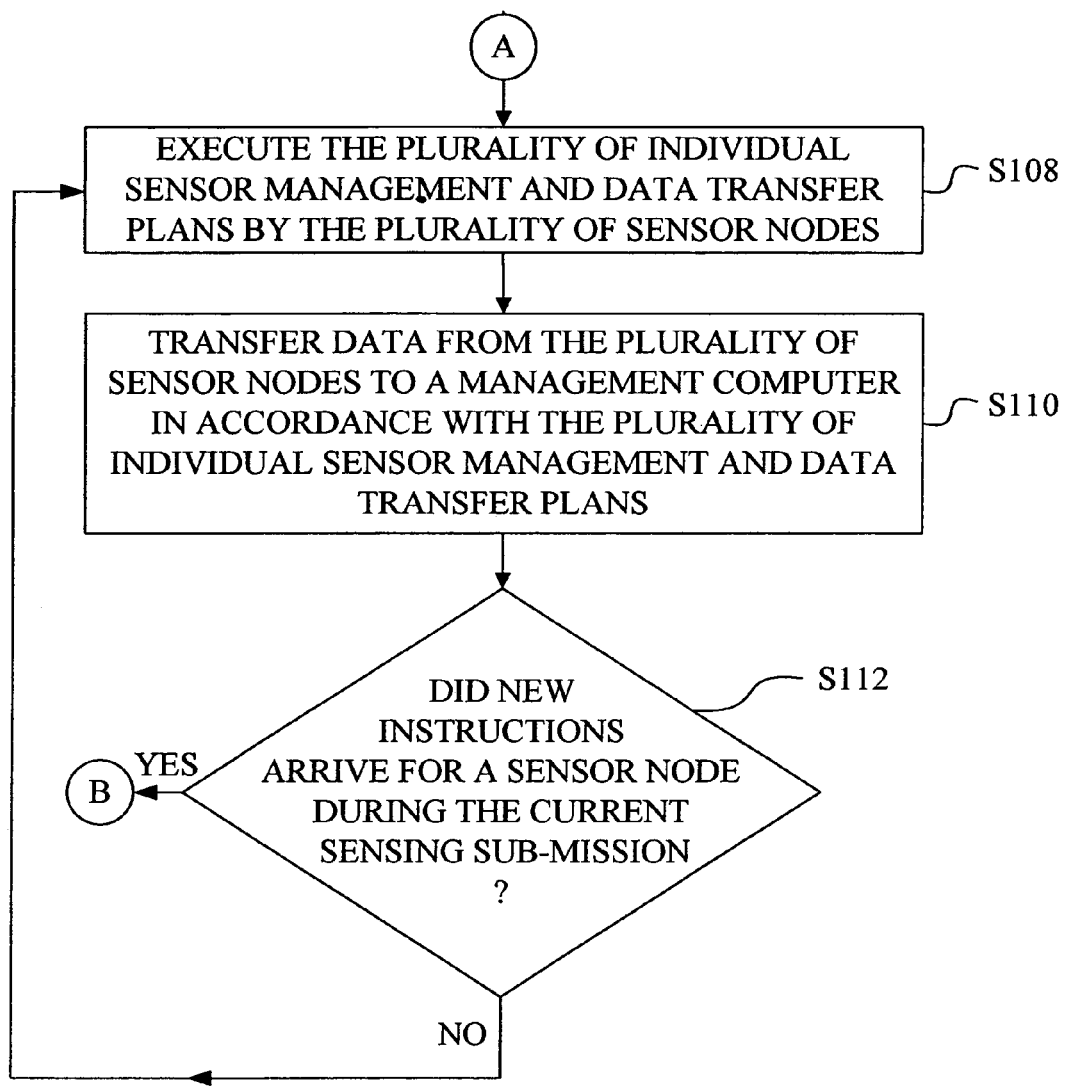

FIGS. 3A and 3B form a flowchart of a method of regulating wireless sensor network energy use in a wireless sensor network, such as for example, wireless sensor network 10.

At step S100, an energy management plan is generated for a management period for a sensing mission, and executed by management computer 12. The energy management plan may be generated, for example, by management computer 12 executing a software program including software instructions to carry out the following. In an exemplary context of agricultural production, the management period may be, for example, a cropping season, i.e., from field preparation prior to planting a crop through the time of crop harvesting. In this example, the sensing mission involves providing sensor data from at least some of the plurality of sensor nodes 16 at various times over the entirety of the cropping season. The energy management plan, in this example, determines which subset of sensor nodes of the plurality of sensor nodes 16 will be active, and when, in sensing aspects of sensing region 18, and in transmitting the sensed data and/or relaying the sensed data to management computer 12 via one of the AP nodes 14.

In summary, each energy management plan may be divided into a plurality of energy management sub-plans, each management period may be divided into a plurality of management sub-periods, and each sensing mission may be divided into a plurality sensing sub-missions. The energy management sub-plans corresponding to the plurality of management sub-periods, respectively, and to the plurality of sensing sub-missions, respectively. In other words, a sensing mission is divided into a plurality of sensing sub-missions, with each sensing sub-mission having a corresponding energy management sub-plan executed over a corresponding management sub-period. The energy management plan uses variable timing and variable sensor node participation driven by the need to make timely operational decisions, e.g., crop management needs, and geostatistical needs, constrained by the need for all of the sub-missions of the sensing mission to be completed during the management period.

During initialization of generating the energy management plan for the management period, the location of the various sensor nodes Nx and the available communication links between nodes Nx and one or more of the AP nodes 14 is determined. This may be done by simple design, such as a matrix having known dimensions and spacing. A more complex design may use geostatistic techniques to vary sensor position based on one or more site attributes (e.g., soil type, slope, proximity to drainage tile, etc.) constrained by the need for a wireless communication path 20-1 from a sensor node Nx to a particular AP node. As a further example, the plurality of sensor nodes 16 may be arbitrary placed, and topology of the sensor node layout may be determined during a self discovery phase where the location of each of the sensor nodes Nx is inferred through triangulation using a distance-correlated attribute, such as wireless communications signal strength. The end result is that a map similar to the one in FIG. 1 may be constructed with each sensor node Nx being localized, i.e., at a known location.

The state of each sensor node Nx may be characterized by information measured by the node itself, determined or assumed at some point in time such as node placement, estimated, etc. The information may be present on the sensor node and is available to management computer 12. The node characterization data may include, for example, the location in some x-y and optionally z frame of reference, such as World Geodetic System 1984 (WGS-84); the total energy available for the management period; the current amount of energy used and/or energy remaining; and which sensor nodes of the plurality of sensor nodes 16 can be reached via a wireless communications path 20-1 from a particular sensor node Nx.

Management computer 12 executes a management program to identify anticipated sensing needs, e.g., environment parameters, to aid in making timely operational decisions for the management period (e.g., growing season) and then, as set forth below, generates an allocation of energy for each sensing sub-mission. Examples of specific sensing sub-missions for a sensing mission, wherein for example sensing region 18 is a corn field, may include, but are not limited to, soil temperature in the spring for planting; soil moisture in the spring for secondary tillage, planting and cultivating; soil moisture in the summer to adjust crop models; and soil moisture in the fall to feed "time to harvest" and "time to till" models; soil moisture to manage irrigation; crop height/stage to time herbicide and pesticide treatments; sounds to identify insect infestations; bio-monitoring to detect funguses and other diseases; air temperature to help a crop model characterize pollination conditions; and wind, temperature, humidity, and sunshine to calculate rate of evaporation (ETO) or otherwise estimate soil moisture loss or crop dry down.

Some of the above needs occur every year, but the duration may vary, such as for example, from the effect of a heavy rain that delays soil or crop drying. Others may occur only in certain years such as conditions for insects and diseases. Also, the management program executing on management computer 12 that does the sensor node planning for the management period (cropping season) can use historical data to assign energies allocated to the monitoring tasks, i.e., sub-missions, mentioned above.

A total available energy supply for a particular sensor node Nx is determined for use during the management period for the sensing mission by management computer 12. Management computer 12 may then allocate an energy amount of the total available energy supply for performing each sensing sub-mission of the sensing mission.

An energy reserve may be established by management computer 12 in the total available energy supply at each sensor node. The energy reserve may be drawn from by a respective sensor node Nx in the event of a change of conditions that cause a sensing sub-mission to require additional energy. For example, the energy reserve may be drawn upon to extend soil moisture monitoring in wet periods, etc.

Also, during the management period, a portion of energy allocated to a less-critical sub-mission, e.g., crop dry-down, may be reallocated by management computer 12 to a more critical sub-mission, e.g., monitoring for a disease to better time chemical application. Any energy that is left over from an allotment to a prior sensing sub-mission may be reallocated by management computer 12 to a subsequent sensing sub-mission.

Also, the management program running on management computer 12 may generate an energy budget based on environment parameters, e.g., historical cropping and weather data, related to the environment of sensing region 18 so there is a predetermined probability that the plurality of sensor nodes 16 will be able to carry out its season long mission, i.e., completion of all sensing sub-missions, without running out of energy. The data collection and energy planning software may be re-run as needed during the sensing mission, e.g., cropping season, as actual energy use and/or remaining energy is reported by the sensor nodes of the plurality of sensor nodes 16 that are active during a particular sensing sub-mission.

While sensing region 18 may be a single area, e.g., a single field, energy trade-offs also may be made across multiple fields as sensing region 18. Thus, energy usage may be reallocated by management computer 12 to the sensor nodes in one field in sensing region 18 for a current sensing sub-mission of disease monitoring, to be "paid back" by the sensor nodes in another field in sensing region 18 performing a future sensing sub-mission, e.g., at crop dry down time.

To satisfy geospatial data distribution needs, manage energy use, and meet communications constraints, each sensing sub-mission has its own management sub-plan. Sub-missions may overlap and may be analyzed for optimization across the two sub-missions.

For a particular sub-mission, the corresponding management sub-mission plan determines a limited number of sensor nodes of the plurality of sensor nodes 16 that will be active, and when they will be active. For example, in a cropping mission, one sensing sub-mission of early season soil moisture and temperature sensing may start in early April, with a limited number of sensor nodes being made activated to monitor the soil in a few locations, e.g., north hill slope; low, wet area; etc., every few days. As field work approaches, the number of sensors engaged in sensing, particularly in areas of steep moisture gradients, and the frequency of data collection, will increase until the anticipated field operation occurs, e.g., planting.

Once the field operation occurs, a "roll call" of sensors may be performed by management computer 12 to identify any sensor nodes damaged or destroyed by the field operation. The management computer 12 may consider these sensor node losses in future planning, or may generate a work order to replace the faulty sensor nodes. The decision to replace sensors mid-season will be determined by accessibility to the location (e.g., it would be easier with a small crop), the roll of the damaged sensor nodes for maintaining communication between other sensor nodes and an AP node, and the criticality of the sensor node from a geostatistics perspective.

Following the roll call, many of the sensor nodes may be put back to a sleep mode with a rotating watch being kept. The rotation may be done primarily to spread out energy use across all the active sensor nodes during the sensing submission. The number, spatial distribution, and temporal spacing of updates may be guided by needs of crop and soil models for data and the amount of energy in the energy budget to keep the watch. Some examples of this variable spacing and timing include, for example, delaying temperature measurements in the spring when cold, not soil warming, weather is predicted; delaying pathogen monitoring when winds are blowing away from the monitored field to areas of infestation, e.g., Asian soybean rust spores would not travel against a strong wind; delaying soil moisture measurements when the soil is saturated and more rain is forecast; increasing the spatial and temporal density of acoustic insect monitoring in the area of a field closest to a known external or internal infestation; delaying corn growth stage monitoring when the weather forecast indicates inadequate growing degree days for significant crop growth; and increasing soil moisture sensing spatial and temporal frequency in the area of a suspected drainage tile problem.

When the next sensing sub-mission approaches, the number, location, and reporting rate of the participating sensor nodes of the plurality of sensor nodes 16 will be managed by management computer 12, and communicated to the participating sensor nodes via one or mode of AP nodes 14.

At step S102, relevant environment parameters are identified for sensing region 18 for a current energy management sub-plan for a current sensing sub-mission. For example, management computer 12 may execute the management program to identify the relevant environment parameters related to an environment of sensing region 18 needed to make an operational decision, such as for example, deciding a time to till, a time to fertilize, a time to plant, a time to spray, and a time to harvest. Relevant environment parameters include, for example, atmospheric condition, soil temperature, air temperature, soil moisture, rate of evaporation, historical seasonal data, wind speed, vegetation growth stage, biological or insect infestation, and geological attributes. As mentioned above, particular sub-missions have particular sensing objectives, and the particular sensor nodes Nx's forming a subset of the sensor nodes 16 that is selected for use during the current sub-mission have sensors, e.g., temperature sensors, moisture sensors, velocity sensors, or bio-sensors, etc., to provide relevant sensing information during the current sub-mission.

As a more specific example, management computer 12 may identify soil temperature as relevant to a time to plant, but not relevant to a time to spray, and a time to harvest. As another more specific example, management computer 12 may identify wind speed as of critical relevance for determining a time to spray and a time to fertilize (e.g. broadcast), and as of lesser relevance for a time to plant and a time to till when soil moisture may be a predominant consideration.

At step S104, a plurality of individualized sensor management and data transfer plans for the plurality of sensor nodes 16 is generated by management computer 12 for the current energy management sub-plan based on the relevant environment parameters. At step S104, the aspects covered in step S100 are applied to generate the plurality of individualized sensor management and data transfer plans for the current energy management sub-plan. Also, a preliminary energy management sub-plan corresponding to a particular sensing sub-mission may need to be re-planned given current sensing sub-mission needs, current sensor node energy availability, and the current network configuration, e.g., to account for sensor nodes that have failed or for some reason are no longer available.

At step S106, a corresponding sensor management and data transfer plan of the plurality of individualized sensor management and data transfer plans generated at step S104 is downloaded from management computer 12 to each individual sensor node Nx. To minimize data transmission and related energy use during downloading, the sensor management and data transfer plans will typically have a small file size. The downloaded individualized plan may include, for example, a node identifier, a sleep schedule, a sensing schedule, a data transfer schedule, and a repetition schedule.

Each individualized plan could require as few as 4 or 5 bytes, using encoding techniques known in the art. Later, new instructions may arrive at a particular sensor node Nx that would change, e.g., increase or decrease, the data collection and transfer frequency, as desired. Only active sensor nodes and those "on call" to be activated would participate in transfer of data to one of the AP nodes 14 and the transfer of instructions, e.g., individualized sensor management and data transfer plans, from the AP node to the participating sensor nodes 16. The remainder of the sensor nodes may continue to sleep and conserve power.

At step S108, the plurality of individualized sensor management and data transfer plans are executed by the plurality of sensor nodes 16. In particular, a respective processor device 22 of each of the participating sensor nodes of the plurality of sensor nodes 16 executes the program instructions downloaded at step S106, i.e., executing on a per sensor node basis the downloaded individualized plan for sleeping, sensing and processing sensor data, transferring sensor data, and receiving new instructions.

By executing the plurality of individualized sensor management and data transfer plans, data collection from the plurality of sensor nodes 16 is adjusted based on the one or more relevant environment parameters to adjust a power consumption of at least one sensor node of the plurality of sensor nodes 16. Consideration of the relevant environment factors results, for example, in a spatial selection of a subset of sensor nodes 16 that will participate in the current sensing mission, as well as a selection of a time and frequency for each sensor node Nx in the subset to perform sensing, and selection of a time and frequency for each sensor node Nx in the subset to perform a data transfer.

At step S110, data is transferred from the plurality of sensor nodes 16 to management computer 12 in accordance with the plurality of individualized sensor management and data transfer plans. The data transfer from each participating sensor node Nx of the plurality of sensor nodes 16 may be done using multi-hop routing and predefined data format protocols, e.g., Bluetooth and Zigbee. Besides sensor data, a current estimate or measure of the remaining sensor node energy, e.g., battery voltage, and general node health, e.g., sensor condition, may be sent to management computer 12 via one or mode of the AP nodes 14.

At step S112, it is determined, e.g., by the respective sensor nodes Nx, or alternatively by management computer 12, whether new instructions arrived for a sensor node Nx during the current sensing sub-mission.

If the determination at step S112 is NO, the process returns to step S108 to continue to execute the current sensor management and data transfer plans by the respective participating sensor nodes.

If the determination at step S112 is YES, then the process returns to step S106. At step S106, a revision or supplement to the current sensor management and data transfer plan may be downloaded from management computer 12 to the respective sensor nodes. For example, new instructions for the current plan may arrive that would modify the current data collection and transfer frequency. As another possibility, the new instructions may pertain to downloading the next individualized sensor management and data transfer plans associated with the next sensing sub-mission.

According to the above method, the present invention achieves energy savings by using sensor nodes only as spatially needed in sensing region 18 to support operational, i.e., management, decisions and by varying the temporal sensor node activation and communication based at least one environment parameter related to the environment of sensing region 18, e.g., current sensed and/or forecasted soil, weather and/or crop conditions, in support of an upcoming operational decision, e.g., time to till, a time to fertilize, a time to plant, a time to spray (e.g., herbicides), a time to harvest, etc. The result is an overall energy savings by wireless sensor network 10 based on individual energy savings experienced by one or more of the plurality of sensor nodes 16.

This energy management may be translated to customer value in a number of ways. One example is the reduction in size, and consequently cost, of the on-board stored energy source 30, e.g., battery, wherein taken across an entire farm, a small node savings could translate into a large total savings. Another example is that the energy savings may allow sensor nodes 16 to be powered for more than one growing season, saving cost of materials and labor to replace or re-power the depleted sensor nodes. Another example is that the energy savings may increase the probability that the sensing mission for the entire year can be achieved by having energy reserves available for collecting data in extraordinary situations, e.g., moisture extremes, disease/pest outbreaks, etc.

Having described the preferred embodiment, it will become apparent that various modifications can be made without departing from the scope of the invention as defined in the accompanying claims.

The invention claimed is:

1. A method of regulating wireless sensor network energy use in a wireless sensor network having at least one access point node, and having a plurality of sensor nodes defining a sensing region, comprising:
   generating an energy management plan for a sensing mission that lasts for a management period, said energy management plan controlling an operation of said plurality of sensor nodes based on at least one environment parameter related to an environment of said sensing region;
   downloading at least a portion of said energy management plan to said plurality of sensor nodes; and
   adjusting data collection from said plurality of sensor nodes based on said energy management plan during said management period to adjust a power consumption of at least one sensor node of said plurality of sensor nodes.

2. The method of claim 1, wherein said energy management plan establishes an energy budget for each sensor node of said plurality of sensor nodes, said energy budget satisfying a predetermined probability that said sensing mission will be completed without exhausting an available supply of energy.

3. The method of claim 1, wherein said energy management plan includes individualized measurement and data transfer plans for each of said plurality of sensor nodes.

4. The method of claim 1, wherein said sensing mission includes a plurality of sensing sub-missions during said management period, the method further comprising:
   determining a total available energy supply for a particular sensor node for use during said management period for said sensing mission; and
   allocating an energy amount of said total available energy supply that said particular sensor node may use for performing each sensing sub-mission of said plurality of sensing sub-missions.

5. The method of claim 4, further comprising establishing from said total available energy supply an energy reserve to be drawn from by said particular sensor node in the event of a change of conditions that cause a sensing sub-mission to require additional energy.

6. The method of claim 4, wherein during said management period, the method reallocating a portion of energy allocated to a less-critical sensing sub-mission to a more critical sensing sub-mission.

7. The method of claim 4, wherein during said management period, any energy left over from an allotment to a prior sensing sub-mission is reallocated to a subsequent sensing sub-mission.

8. The method of claim 1, wherein said management period is a growing season of an agricultural product.

9. The method of claim 1, wherein said adjusting data collection from said plurality of sensor nodes includes selecting a subset of said plurality of sensor nodes to provide sensor data relating to said at least one environment parameter.

10. The method of claim 9, wherein said adjusting data collection from said plurality of sensor nodes includes selecting a time and frequency for each sensor node in said subset to perform sensing, and selecting a time and frequency for each sensor node in said subset to perform a data transfer.

11. The method of claim 1, wherein said at least one environment parameter includes with respect to said sensing region at least one of atmospheric condition, soil moisture, rate of evaporation, historical seasonal data, vegetation growth stage, biological or insect infestation, and geological attributes.

12. A method of regulating wireless sensor network energy use in a wireless sensor network having at least one access point node, and having a plurality of sensor nodes defining a sensing region, comprising:
   generating an energy management plan for a management period for a sensing mission, said energy management plan having a plurality of energy management sub-plans for a corresponding plurality of management sub-periods for a corresponding plurality of sensing sub-missions;
   identifying relevant environment parameters for said sensing region for a current energy management sub-plan for a current sensing sub-mission;
   generating for said current energy management sub-plan a plurality of individualized sensor management and data transfer plans for said plurality of sensor nodes based on said relevant environment parameters;
   downloading to each individual sensor node a corresponding sensor management and data transfer plan of said plurality of individualized sensor management and data transfer plans;
   executing said plurality of individualized sensor management and data transfer plans by said plurality of sensor nodes; and
   transferring data from said plurality of sensor nodes to a management computer in accordance with said plurality of individualized sensor management and data transfer plans.

13. The method of claim 12, wherein if new instructions arrive for a sensor node during said current sensing sub-mission, then at least one sensor node of said plurality of sensor nodes executing a corresponding revised sensor management and data transfer plan.

14. The method of claim 12, wherein at the conclusion of said current sensing sub-mission, then repeating the downloading, executing and transferring steps for a next sensing sub-mission of said sensing mission.

15. The method of claim 12, wherein said relevant environment parameters includes at least one of atmospheric condition, soil moisture, rate of evaporation, historical seasonal data, vegetation growth stage, biological or insect infestation, and geological attributes.

16. The method of claim 12, wherein said relevant environment parameters includes geostatistical and crop management factors.

17. The method of claim 12, further comprising:
   determining a total available energy supply for a particular sensor node for use during said management period for said sensing mission; and
   allocating an energy amount of said total available energy supply that said particular sensor node may use for performing each sensing sub-mission of said plurality of sensing sub-missions.

18. The method of claim 17, further comprising establishing an energy reserve from said total available energy supply to be drawn from by said particular sensor node in the event of a change of conditions that cause a sensing sub-mission to require additional energy.

19. The method of claim 17, wherein during said management period, the method reallocating a portion of energy allocated to a less-critical sensing sub-mission to a more critical sensing sub-mission.

20. The method of claim 17, wherein during said management period, any energy left over from an allotment to a prior sensing sub-mission is reallocated to a subsequent sensing sub-mission.

21. The method of claim 12, wherein said management period is a growing season of an agricultural product.

* * * * *